US012511712B2

(12) United States Patent
Huang

(10) Patent No.: US 12,511,712 B2
(45) Date of Patent: Dec. 30, 2025

(54) IMAGE ANALYSIS METHOD AND IMAGE ANALYSIS DEVICE

(71) Applicant: VIVOTEK INC., New Taipei (TW)

(72) Inventor: Chao-Tan Huang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 272 days.

(21) Appl. No.: 18/379,176

(22) Filed: Oct. 12, 2023

(65) Prior Publication Data

US 2024/0144422 A1 May 2, 2024

(30) Foreign Application Priority Data

Oct. 27, 2022 (TW) .................................. 111140816

(51) Int. Cl.
*G06T 3/4046* (2024.01)
*G06T 3/4084* (2024.01)
*G06V 10/22* (2022.01)
*G06V 10/82* (2022.01)
*G06V 20/52* (2022.01)

(52) U.S. Cl.
CPC .......... *G06T 3/4046* (2013.01); *G06T 3/4084* (2013.01); *G06V 10/225* (2022.01); *G06V 10/82* (2022.01); *G06V 20/52* (2022.01)

(58) Field of Classification Search
CPC ..... G06T 3/4046; G06T 3/4084; G06V 20/52; G06V 10/82; G06V 10/225
See application file for complete search history.

(56) References Cited

U.S. PATENT DOCUMENTS

| 6,757,008 B1 * | 6/2004 | Smith ...................... H04N 7/18 |
| | | 348/169 |
| 8,542,872 B2 * | 9/2013 | Gornick ........... G08B 13/19602 |
| | | 382/106 |
| 8,625,973 B2 * | 1/2014 | Pardue .................. H04N 7/181 |
| | | 386/326 |
| 8,634,592 B2 * | 1/2014 | Casamona ................ G06T 7/20 |
| | | 382/103 |

(Continued)

FOREIGN PATENT DOCUMENTS

| CN | 114882459 A | 8/2022 | |
| WO | WO-2020065384 A1 * | 4/2020 | ........... H04B 7/0617 |
| WO | WO-2022126054 A2 * | 6/2022 | ............... G06T 7/12 |

OTHER PUBLICATIONS

Reilly et al, "Detection and Tracking of Large Number of Targets in Wide Area Surveillance" (pp. 186-199). (Year: 2010).*

*Primary Examiner* — Manav Seth
(74) *Attorney, Agent, or Firm* — Winston Hsu

(57) ABSTRACT

An image analysis method of increasing identification efficiency is applied to an image analysis device having an image receiver and an operation processor. The image analysis method includes setting a target pixel per feet (PPF) and detecting a specific area within a surveillance image acquired by the image receiver, computing a first dimension ratio difference between the target PPF and an initial PPF of the specific area, utilizing the first dimension ratio difference to adjust the specific area so that a second dimension ratio difference between the target PPF and an adjusted PPF of the adjusted specific area conforms to a preset condition, and utilizing the adjusted specific area with the adjusted PPF to be detection data for object detection network.

20 Claims, 10 Drawing Sheets

(56) References Cited

U.S. PATENT DOCUMENTS

| | | | | |
|---|---|---|---|---|
| 8,724,970 | B2* | 5/2014 | Johnson | G08B 13/19608 |
| | | | | 386/290 |
| 8,982,209 | B2* | 3/2015 | Pardue | H04N 7/181 |
| | | | | 348/143 |
| 9,286,518 | B2* | 3/2016 | Gornick | G06T 17/05 |
| 9,305,331 | B2* | 4/2016 | Huang | G06T 3/4038 |
| 10,453,177 | B2* | 10/2019 | Upendran | G06F 30/00 |
| 10,521,645 | B2* | 12/2019 | Adato | G07G 1/0036 |
| 2004/0001149 | A1* | 1/2004 | Smith | H04N 23/00 |
| | | | | 348/E7.086 |
| 2011/0317924 | A1* | 12/2011 | Fukushi | G06V 10/44 |
| | | | | 382/199 |
| 2019/0034734 | A1* | 1/2019 | Yen | G06F 18/2413 |
| 2025/0037473 | A1* | 1/2025 | Dholakiya | G06V 10/225 |

* cited by examiner

IMAGE ANALYSIS METHOD AND IMAGE ANALYSIS DEVICE

BACKGROUND OF THE INVENTION

1. Field of the Invention

The present invention relates to an image analysis method and an image analysis device, and more particularly, to an image analysis method of increasing identification efficiency and a related image analysis device.

2. Description of the Prior Art

The neural network using deep learning for image identification can extract the plurality of identification features from the detection image, and the plurality of identification features are transformed at different layers via the activation function; therefore, the input of the previous neuron layer is transformed into the output of the previous neuron layer for being another input of the next neuron layer. If the identification features have low similarity, a layer number of the neural network, a neuron number of each layer, a connection way of the neurons between different layers, and setting of the activation function can become more complicated. The identification features of an object to be detected at different positions inside the detection image can have the lower similarity due to differences in the capturing angle, which increases computation load of the neural network. Therefore, design of a neural network image identification method of increasing the identification efficiency is an important issue in the related image identification industry.

SUMMARY OF THE INVENTION

The present invention provides an image analysis method of increasing identification efficiency and a related image analysis device for solving above drawbacks.

According to the claimed invention, an image analysis method of increasing identification efficiency is applied to an image analysis device having an image receiver and an operation processor. The image analysis method includes setting a target pixel per feet and detecting at least one specific area inside a surveillance image acquired by the image receiver, computing a first dimension ratio difference between the target pixel per feet and an initial pixel per feet of the specific area, utilizing the first dimension ratio difference to adjust the specific area so that a second dimension ratio difference between the target pixel per feet and an adjusted pixel per feet of the adjusted specific area conforms to a preset condition, and utilizing the adjusted specific area with the adjusted pixel per feet to be detection data for an object detection network.

According to the claimed invention, an image analysis device includes an image receiver and an operation processor. The image receiver is adapted to receive a surveillance image. The operation processor is electrically connected to the image receiver in a wire manner in a wireless manner, and adapted to set a target pixel per feet and detecting at least one specific area inside the surveillance image, compute a first dimension ratio difference between the target pixel per feet and an initial pixel per feet of the specific area, utilize the first dimension ratio difference to adjust the specific area so that a second dimension ratio difference between the target pixel per feet and an adjusted pixel per feet of the adjusted specific area conforms to a preset condition, and utilize the adjusted specific area with the adjusted pixel per feet to be detection data for object detection network.

The image analysis method and the image analysis device of the present invention can provide several transformation ways to adjust the specific area or the close shot area at different positions inside the surveillance image to have the same or similar pixel dimension ratio. The specific area or the close shot area or the long shot area at different positions inside the surveillance image can have higher direction similarity, so as to increase the computation speed of the object detection network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
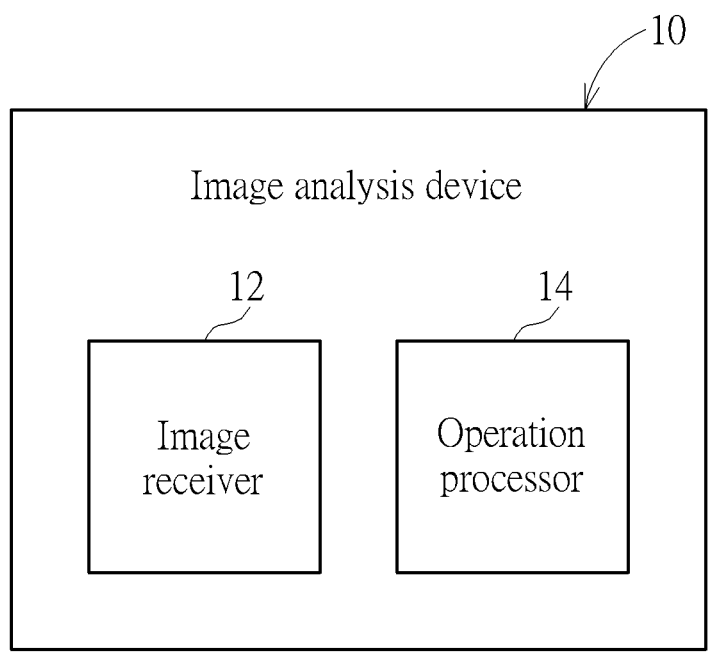
FIG. 1 is a functional block diagram of an image analysis device according to an embodiment of the present invention.
Figure 2:
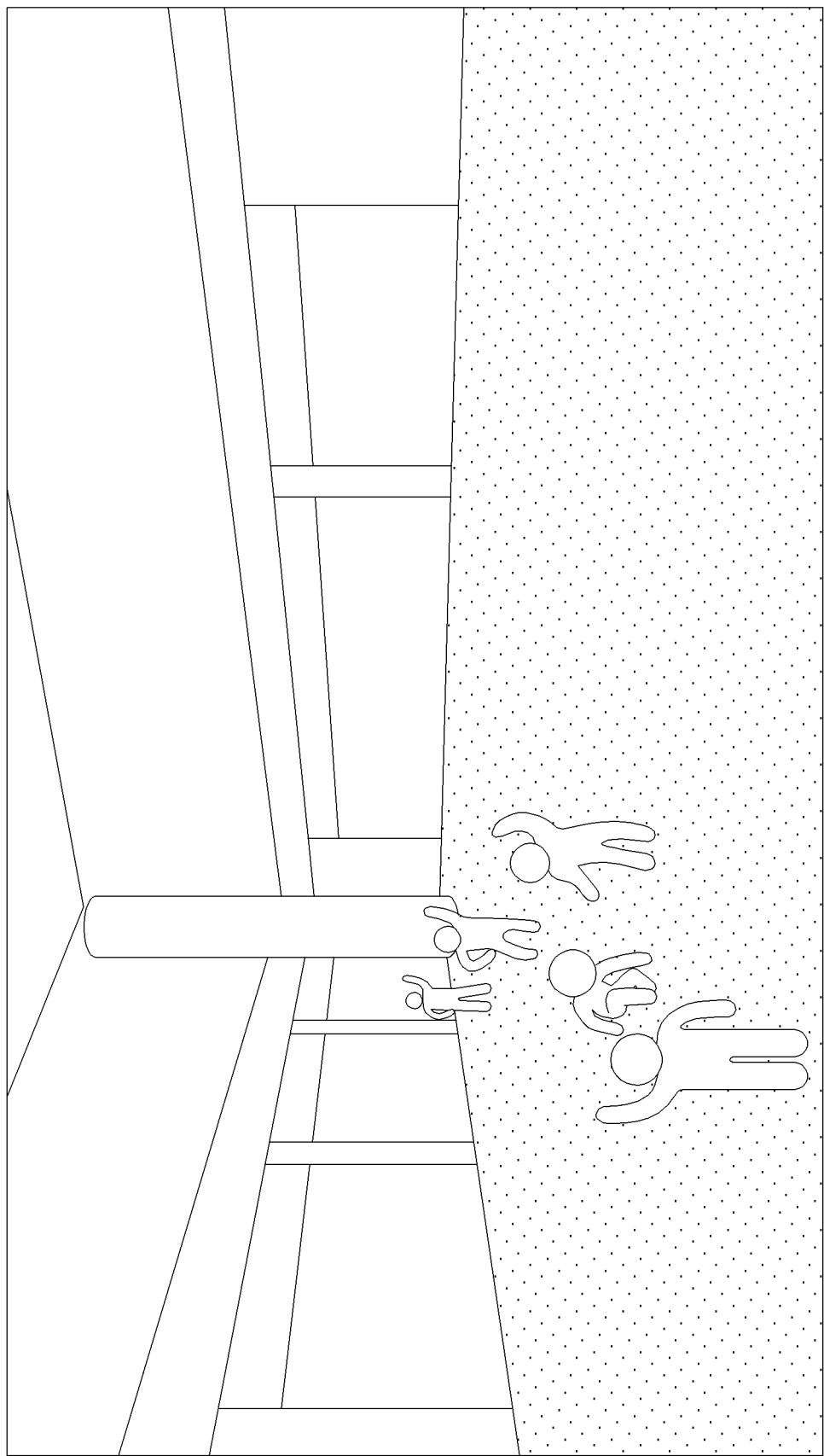
FIG. 2 is a diagram of a surveillance image acquired by the image analysis device according to the embodiment of the present invention.

Please refer to FIG. 1 and FIG. 2. FIG. 1 is a functional block diagram of an image analysis device 10 according to an embodiment of the present invention. FIG. 2 is a diagram of a surveillance image I acquired by the image analysis device 10 according to the embodiment of the present invention. The image analysis device 10 can include an image receiver 12 and an operation processor 14. The image receiver 12 can directly capture and acquire the surveillance image I, or can receive the surveillance image I captured by and transmitted from an external camera. The operation processor 14 can be electrically connected to the image receiver 12 in a wire manner or in a wireless manner. The operation processor 14 can adjust an object feature parameter inside the surveillance image I so as to transform the surveillance image I into data to be detected for deep learning.

Figure 3:
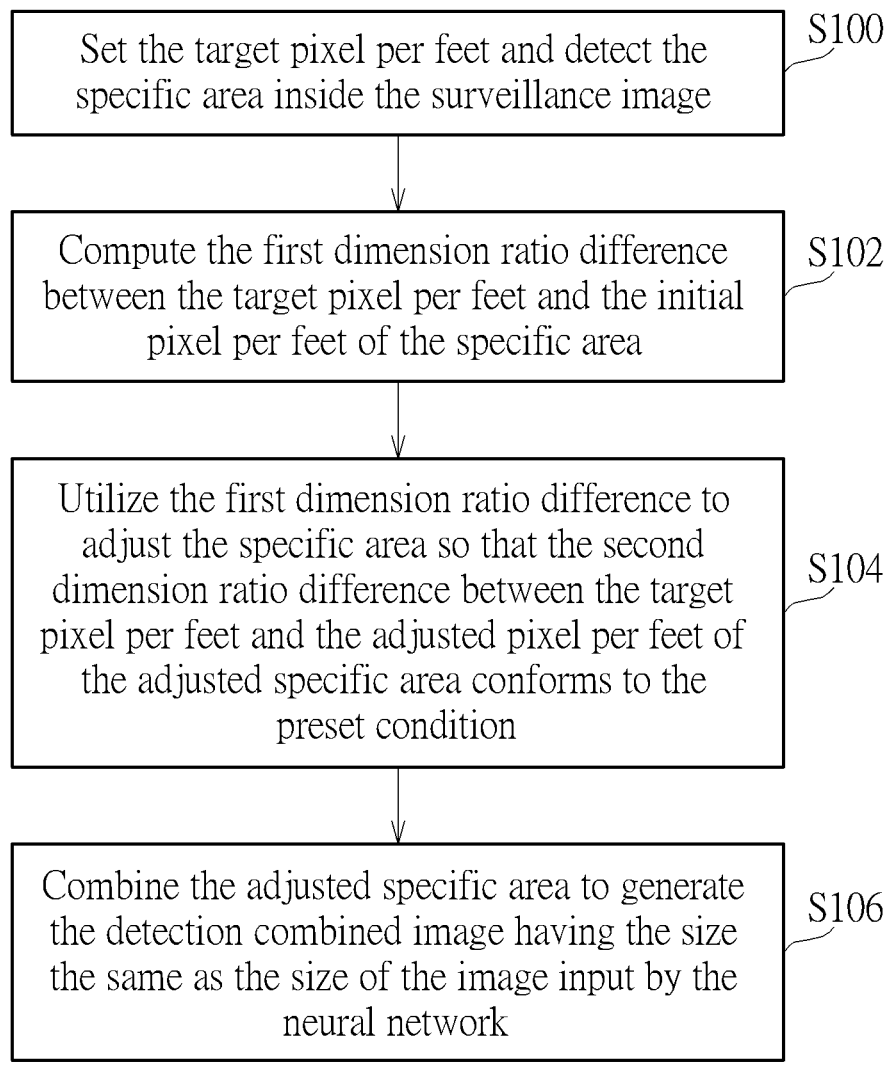
FIG. 3 is a flow chart of an image analysis method according to the embodiment of the present invention.
Figure 4:
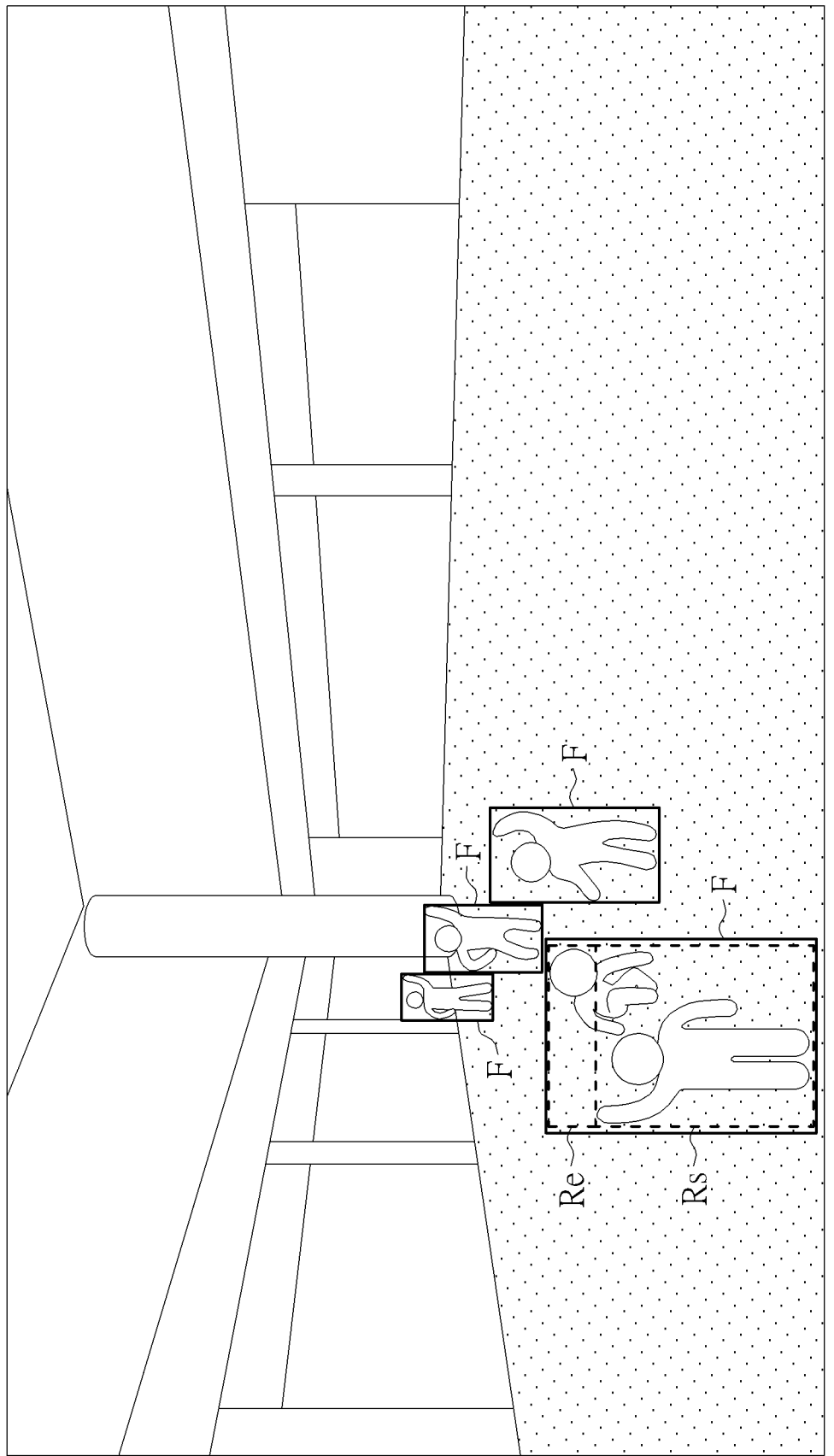
FIG. 4 is a diagram of the surveillance image transformed into the data to be detected according to a first embodiment of the present invention.
Figure 5:
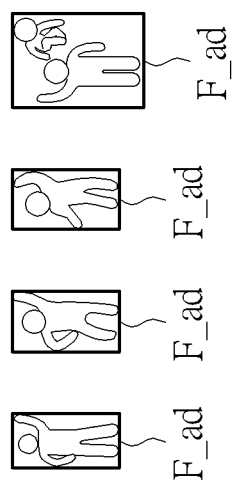
FIG. 5 is a diagram of a detection combined image used as the data to be detected according to the first embodiment of the present invention.

Please refer to FIG. 3 to FIG. 5. FIG. 3 is a flow chart of an image analysis method according to the embodiment of the present invention. FIG. 4 is a diagram of the surveillance image I transformed into the data to be detected according to a first embodiment of the present invention. FIG. 5 is a diagram of a detection combined image Ia used as the data to be detected according to the first embodiment of the present invention. The image analysis method illustrated in FIG. 3 can be suitable for the image analysis device 10 shown in FIG. 1. The present invention can execute training of convolutional neural network; the present invention can be applied, but not limited, to the convolutional neural network, and can be further applied to self-attention network, yolo network and so on. First, several images can be acquired from a database, and a target pixel per feet can be set accordingly, such as 10 PPF (which means pixel per feet, or can be interpreted as a pixel dimension ratio). Then, common object identification technique can be used to find out at least one specific object from the several images, such as the human, and his marking frame (bounding area) can be set to compute an original pixel per feet of each of the specific object. The target pixel per feet can be a preset value, or can be computed in real time. If the original pixel per feet of the specific object is greater than the target pixel per feet, the specific object and the related marking frame (bounding area) can be scaled down proportionally, and an adjusted pixel per feet of the scaled-down specific object can be the same as or similar to the target pixel per feet. Final, the specific object with the adjusted pixel per feet can be combined with a background image, and the background image can be transmitted towards the convolutional neural network for further training; the background image has a size the same as a size of any image inside the database.

In a training process, the present invention can optionally divide the specific object inside the several images into different categories, such as a full body category, a half body category and a chest category; an object average height can be set as a maximal height of each category, and the target pixel per feet and the object average height can be used to compute a zooming ratio and a related height of each category. The specific object with the adjusted pixel per feet and the related marking frame can be combined with the background image for being a training datum of the convolutional neural network.

If only one specific object is found inside the image, or several specific objects are found and a dimensional difference between the several specific objects is smaller than a predefine threshold, the present invention can optionally scale down the whole image in a proportional manner. When the whole image is scaled down proportionally, the scaled-down image can be combined with the background image having the size the same as the size of the image inside the database for setting as the training datum of the convolutional neural network. The foresaid process of scaling down proportionally can be based on a ratio of the original pixel per feet of the specific object to the target pixel per feet, and an actual application is not limited to the above-mentioned embodiment. In another situation, if the original pixel per feet of one or some specific objects is smaller than the target pixel per feet, the present invention can acquire a maximal original pixel per feet from one or some specific objects to compute a ratio of the maximal original pixel per feet to the target pixel per feet, and the foresaid ratio can be used to scale up the original pixel per feet of the specific object for acquiring the adjusted pixel per feet; the specific object having the adjusted pixel per feet can be combined with the background image for setting as the training datum of the convolutional neural network.

The convolutional neural network after the training process can be used as the object detection network, and the image analysis method of the present invention can provide the suitable detection combined image for object detection. With regards to the image analysis method, step S100 can be executed to set the target pixel per feet (such as 10 PPF mentioned as above) and detect a specific area F inside the surveillance image I. The target pixel per feet can be the preset value, or can be computed in real time. The specific area F may be a motion area found by pixel variation between two adjacent images, and definition of the specific area F is not limited to the foresaid embodiment. In the first embodiment, the operation processor 14 can detect the motion area inside the surveillance image I and set the marking frame for being the specific area F, which means a movement of the object can be detected. Generally, the motion area far from the lens inside the surveillance image I can have a lower pixel per feet, and the motion area close to the lens of the camera can have a higher pixel per feet. The pixel per feet can be defined as a ratio of an actual dimension of the motion area to a pixel number covered by the surveillance image I. If the pixel dimension ratios of the motion areas inside the training datum are huge different, a large number of architecture layers is required in the convolutional neural network for the deep learning. If the pixel dimension ratios of the motion areas inside the training datum have high similarity, fewer architecture layers are required in the convolutional neural network for the deep learning, which results in effective reduction of an amount of computation. The present invention is designed to adjust the pixel dimension ratio of all the motion areas to be substantially or nearly consistent with each other.

Then, step S102 and step S104 can be executed to compute a first dimension ratio difference between the target pixel per feet and an initial pixel per feet of the specific area F, and utilize the first dimension ratio difference to adjust the specific area F, so that a second dimension ratio difference between the target pixel per feet and the adjusted pixel per feet of an adjusted specific area F_ad can conform to a preset condition. In step S102, a capturing angle and a capturing height of the surveillance image I and other apparatus installation parameters can be used to compute the initial pixel per feet of the specific area F, and the initial pixel per feet can be compared with the target pixel per feet for acquiring the first dimension ratio difference. In step S104, the specific area F can be reduced, so that the adjusted pixel per feet of the adjusted specific area F_ad can be the same as or similar to the target pixel per feet, which means the second dimension ratio difference can conform to the preset condition. The preset condition can be interpreted as a situation that the second dimension ratio difference is smaller than a specific threshold.

Final, step S106 can be executed that the image analysis method can combine one or some adjusted specific areas F_ad to generate the detection combined image Ia having the same size as the image input by the neural network. The detection combined image Ia can be used as the detection data provided for the trained object detection network. As shown in FIG. 4 and FIG. 5, the surveillance image I may have one or several specific areas F, and the initial pixel per feet of each specific area F can be greater than the target pixel per feet. Each specific area F can be individually adjusted in accordance with its first dimension ratio difference relative to the target pixel per feet, and the adjusted pixel per feet of each of the adjusted specific area F_ad can be the same as or similar to the target pixel per feet. An image size of the detection combined image Ia can be the same as an image size of the image input by the neural network. All the adjusted specific areas F_ad can be combined with the detection combined image Ia (that is used as a base image) for providing to the trained object detection network.

In step S102, step S104 and step S106, if the first dimension ratio difference is greater than or equal to the predefine threshold, the initial pixel per feet of the specific area F can be greater than the target pixel per feet, and an area dimension ratio resulted from the first dimension ratio difference can be computed, and then the specific area F can be scaled down by the area dimension ratio to acquire the adjusted specific area F_ad for combining the adjusted specific area F_ad with the detection combined image Ia, so as to provide to the trained object detection network. If the first dimension ratio difference is smaller than the predefine threshold, the initial pixel per feet of the specific area F can be similar to the target pixel per feet, and the initial pixel per feet of the specific area F can be not adjusted optionally but further directly combined with the detection combined image Ia, for providing to the trained object detection network.

Please refer to FIG. 4 and FIG. 5. If a distance between the plurality of specific areas F is small, the specific area F may cover several moving objects at the same time, such as the specific area F in the left side of the surveillance image I covering two moving objects. The apparatus installation parameter of the camera is the known parameter, and the object average height (such as a pedestrian height or a vehicle height) of an area where on the image analysis device 10 is installed are also the known parameter, so the image analysis method can utilize the apparatus installation parameter and the object average height to acquire a predefined dimension relevant to the installation area, and determine whether the specific area F exceeds the predefined dimension, so as to rapidly decide whether the specific area F covers one or several moving objects.

If the specific area F does not exceed the predefined dimension, the specific area F is interpreted as covering one moving object, and the image analysis device 10 can execute the image analysis method mentioned as above, to acquire the detection combined image Ia capable of increasing image identification efficiency for being the detection data of the object detection network. If the specific area F exceeds the predefined dimension, the specific area F may be interpreted as covering several moving objects; in the meantime, the image analysis method can compute an object height of one moving object in the specific area F, and set a range covered by the object height as a selection area Rs; the selection area Rs can be drawn based on a bottom edge of the specific area F. Then, step S102 and step S104 can be executed to compute the first dimension ratio difference between the initial pixel per feet of the selection area Rs and the target pixel per feet, and then utilize the first dimension ratio difference to adjust the selection area Rs.

Besides, the image analysis method can accordingly adjust an exception area Re inside the specific area F that does not belong to the selection area Rs in accordance with an adjustment ratio of the initial pixel per feet of the selection area Rs to the target pixel per feet. Final, the image analysis method can combine the adjusted selection area Rs and the adjusted exception area Re, and set the foresaid combination results as one of the adjusted specific area F_ad, to combine with the detection combined image Ia for being the detection data of the object detection network. As shown in FIG. 4 and FIG. 5, the specific area F in the left side that has the selection area Rs and the exception area Re is obviously greater than other specific areas F; the adjusted specific area F_ad transformed from the specific area F in the left side can cover the several moving objects and therefore have a size greater than a size of other adjusted specific areas F_ad, so that the pixel dimension ratio of an object inside the exception area Re can conform to the target pixel per feet.

The image analysis device 10 of the present invention can be the camera installed on a high position on the wall, and the moving object inside the surveillance image I can stand up on the ground, so that the image analysis method mentioned as above can be executed to transform the image captured by the image analysis device 10 into the required detection combined image Ia. It should be mentioned that if the surveillance image I acquired by the image analysis device 10 is a fisheye image, the image analysis method can optionally rotate the specific area F when the specific area F is marked inside the surveillance image I, and all the specific area F can have the same directionality, and therefore the identification efficiency of the object detection network can be effectively increased by the detection combined image Ia combined by the specific areas F having the same directionality.

Figure 6:
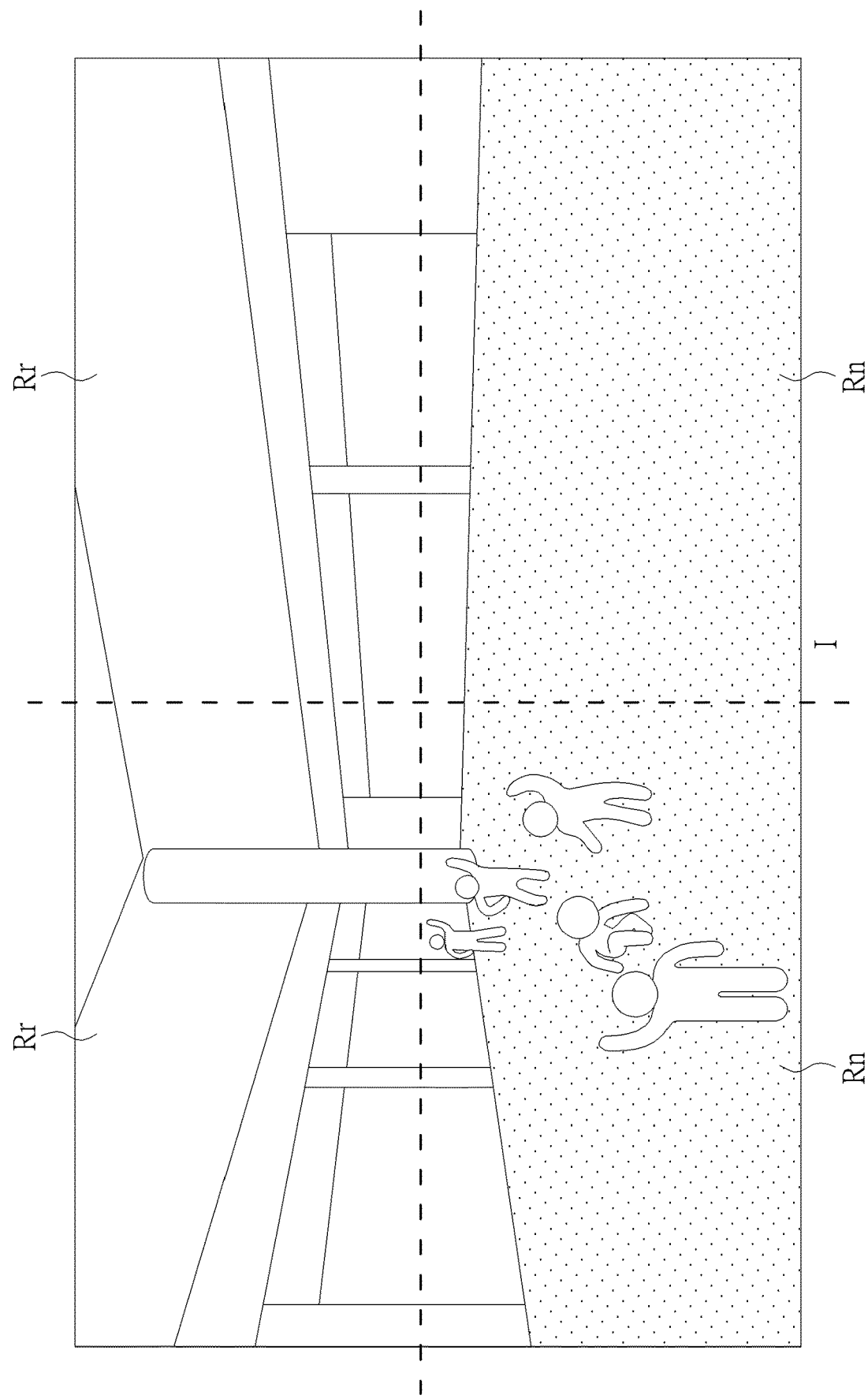
FIG. 6 is a diagram of the surveillance image transformed into the data to be detected according to a second embodiment of the present invention.
Figure 7:
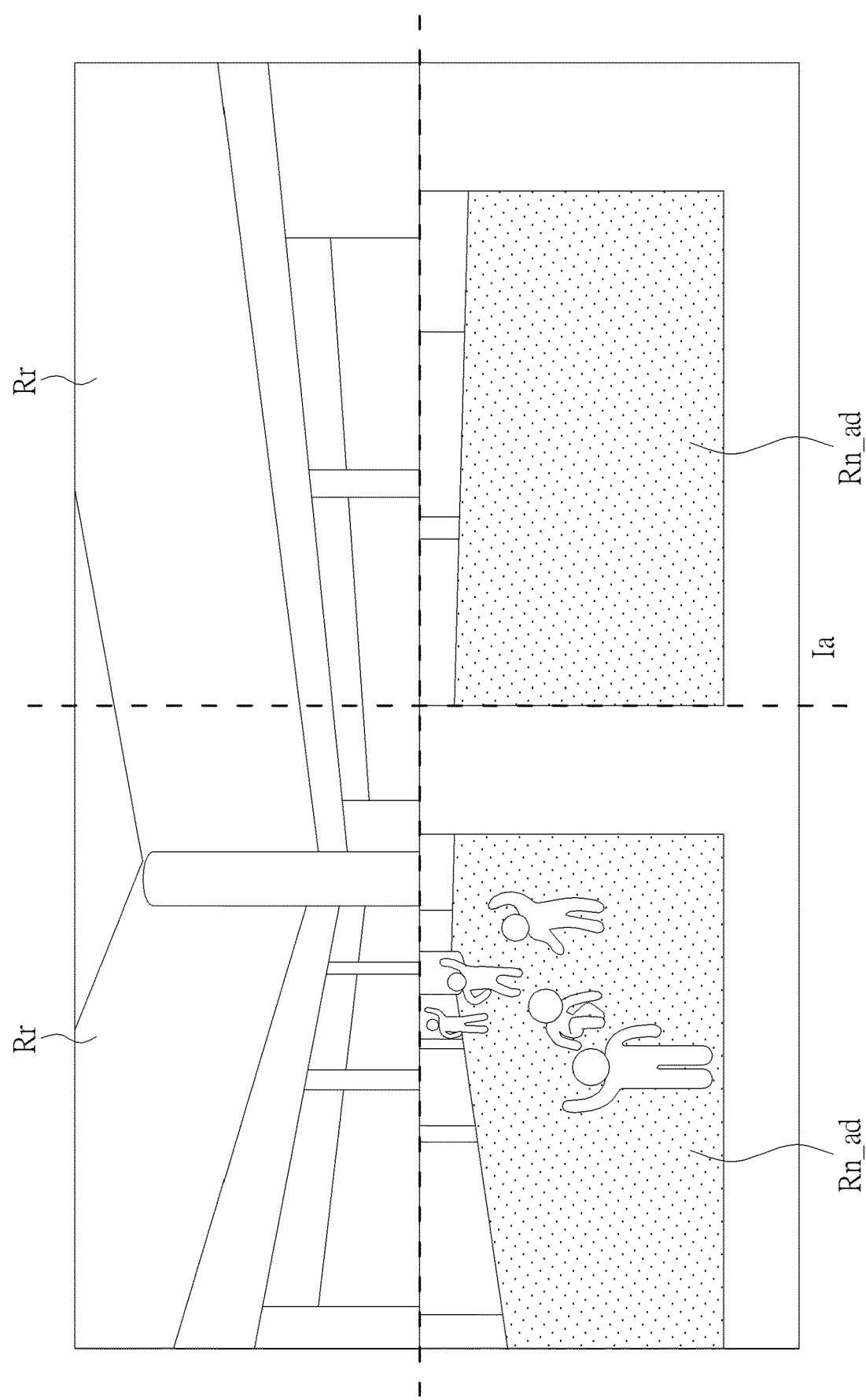
FIG. 7 is a diagram of the detection combined image setting as the data to be detected according to the second embodiment of the present invention.

Please refer to FIG. 6 and FIG. 7. FIG. 6 is a diagram of the surveillance image I transformed into the data to be detected according to a second embodiment of the present invention. FIG. 7 is a diagram of the detection combined image Ia setting as the data to be detected according to the second embodiment of the present invention. In the second embodiment, when the operation processor 14 does not detect the motion area inside the surveillance image I or is intended to detect all static objects inside the surveillance image I, the image analysis method can optionally divide the surveillance image I into several areas in an equal manner or in an unequal manner, such as a long shot area Rr and a close shot area Rn. The pixel dimension ratio of the long shot area Rr can be defined as the target pixel per feet (such as 10 PPF or 15 PPF). The close shot area Rn can have the higher pixel dimension ratio, which can correspond to the specific area F in the first embodiment; difference between the first embodiment and the second embodiment is: the specific area F in the first embodiment is acquired by detecting the motion area, and the close shot area Rn in the second embodiment is acquired via a division result of the surveillance image I. Therefore, the image analysis method can execute step S102, step S104 and step S106 to compute the first dimension ratio difference between the pixel dimension ratio of the long shot area Rr (which may be the same as or similar to the target pixel per feet) and the initial pixel per feet of the close shot area Rn (which may be represented as the initial pixel per feet of the specific area F), and utilize the first dimension ratio difference to adjust the close shot area Rn, and then all the images (such as the long shot area Rr and the adjusted close shot area Rn) can be adjusted in a padding manner or in a cropping manner to be equal to a size the same as the size of the detection combined image Ia input by the neural network, for setting as the detection data of the object detection network.

Figure 8:
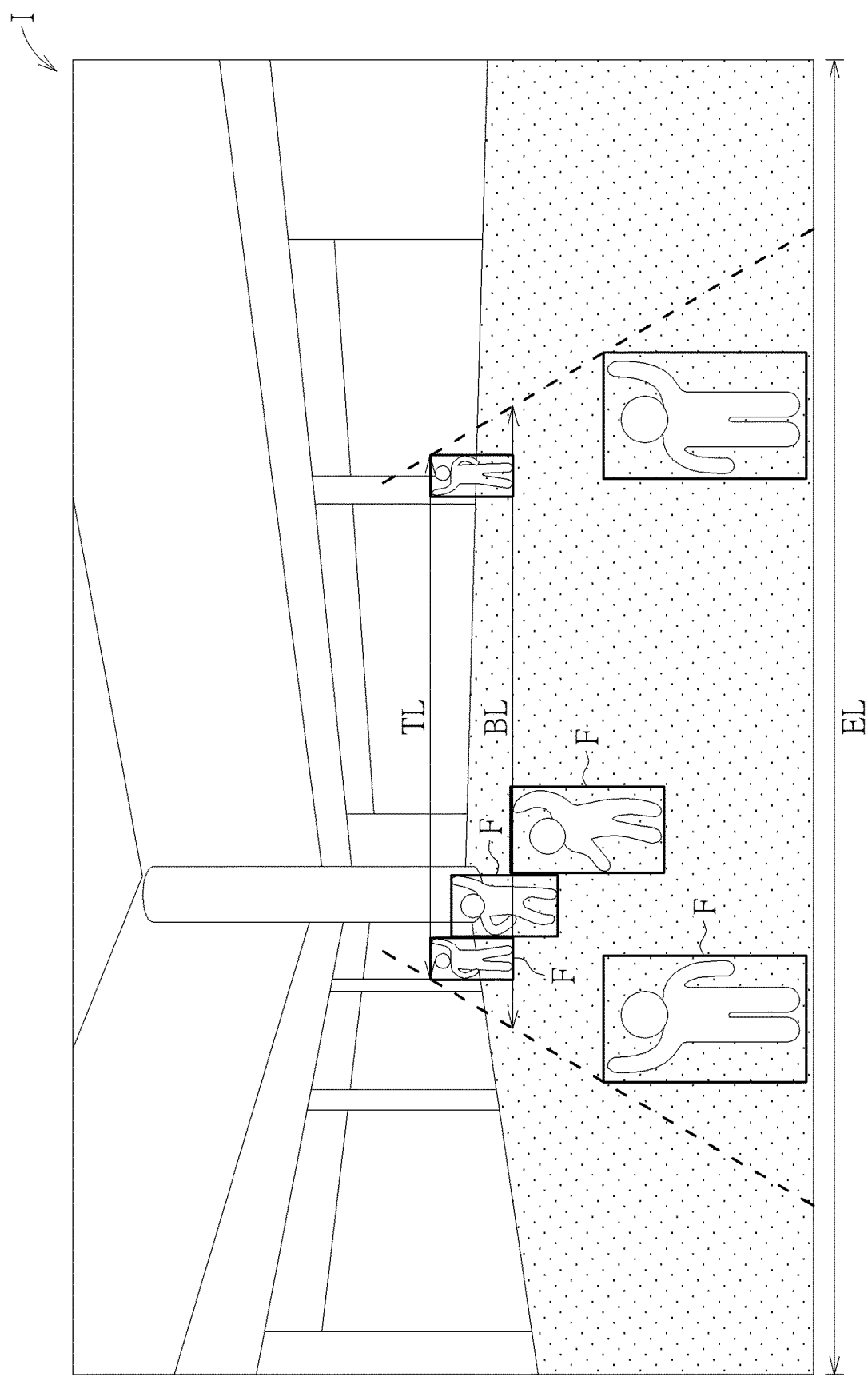
FIG. 8 is a diagram of the surveillance image transformed into the data to be detected according to a third embodiment of the present invention.
Figure 9:
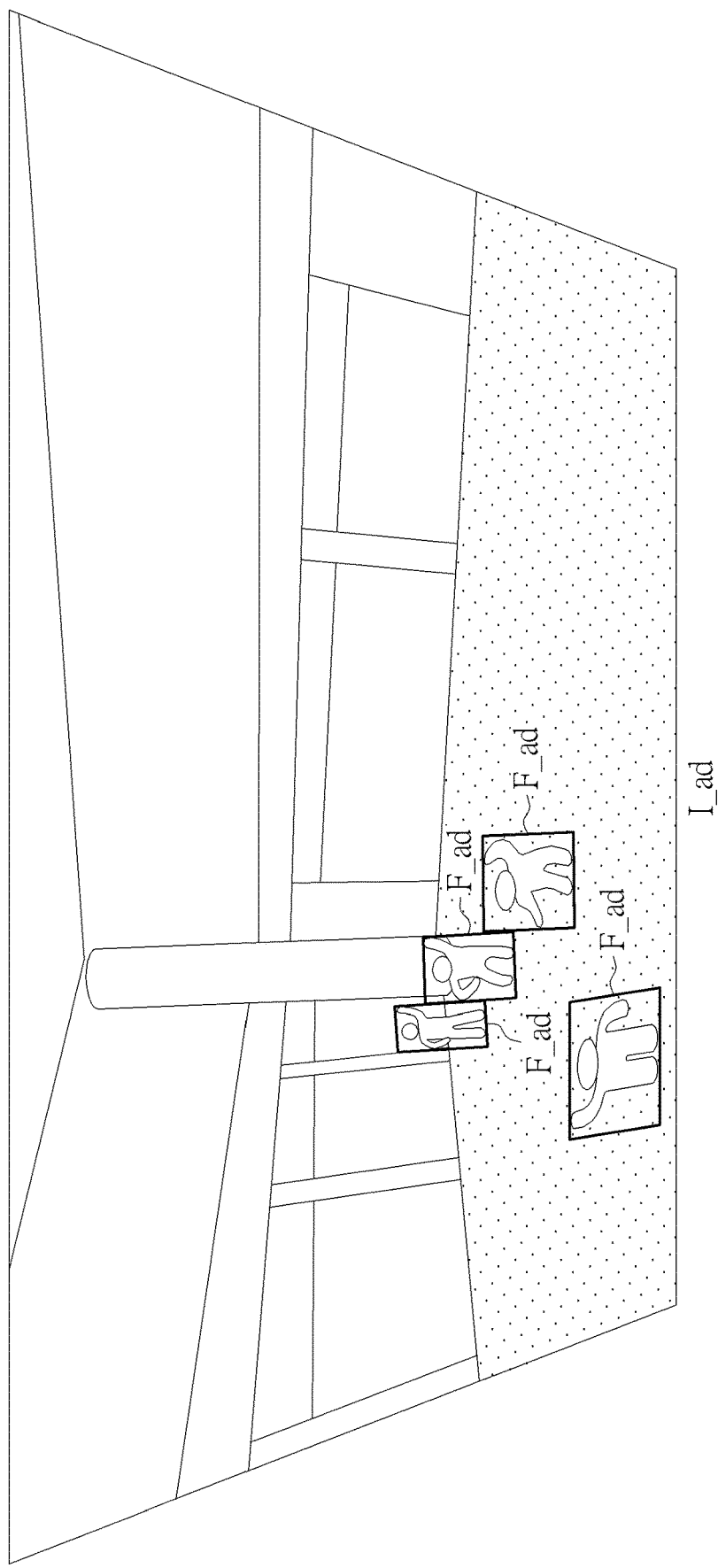
FIG. 9 is a diagram of the adjusted surveillance image according to the third embodiment of the present invention.

Please refer to FIG. 8 and FIG. 9. FIG. 8 is a diagram of the surveillance image I transformed into the data to be detected according to a third embodiment of the present invention. FIG. 9 is a diagram of the adjusted surveillance image I_ad according to the third embodiment of the present invention. In the third embodiment, when the first dimension ratio difference between the target pixel per feet and the initial pixel per feet of the specific area F is acquired by step S102, the perspective transformation matrix can be generated in accordance with the first dimension ratio difference, and then the perspective transformation matrix can be used to adjust the whole surveillance image I. The pixel dimension ratio of the specific area F_ad inside the adjusted surveillance image I_ad can be the same as or similar to the target pixel per feet, which means the second dimension ratio difference between the target pixel per feet and the adjusted pixel per feet of the adjusted specific area F_ad can conform to the preset condition, and therefore the adjusted surveillance image I_ad can be used as the detection data of the object detection network.

As shown in FIG. 8, the image analysis method can acquire a base line BL of the specific area F that has the pixel dimension ratio corresponding to the target pixel per feet in accordance with the apparatus installation parameter of the surveillance image I, and compute a bottom edge length EL of a bottom edge of the surveillance image I in the three-dimensional coordinate system, and further find out a base length on the base line BL corresponding to the bottom edge length EL. The base length can be interpreted as a reduced segment length (can be a segment of the bottom edge length EL) in the two-dimensional image due to perspective difference when the bottom edge length EL is transferred to the three-dimensional coordinate system where on the base line BL is located. The base length can be defined as the bottom edge length of the adjusted surveillance image I_ad. Then, calculate vertical lengths of the object located at the base line BL and the bottom edge length EL in the three-dimensional coordinate system and the two-dimensional image. Final, the image analysis method can utilize a length ratio of the bottom edge length EL to the base length, a height ratio of different specific areas F on the bottom edge length EL and the base line BL in the two-dimensional image, the lengths of the related specific areas F on the bottom edge length EL and the base line BL in the three-dimensional coordinate system, and the vertical lengths of the object (due to the related specific areas F) in the three-dimensional coordinate system to generate the perspective transformation matrix, so as to transform the whole surveillance image I into the adjusted surveillance image I_ad.

Moreover, the image analysis method can find out the specific area F that is near by the lens around the bottom edge of the surveillance image I, and compute the vertical pixel number and the length of the specific area F in the three-dimensional coordinate system, and further acquire a ratio of the specific area F relative to the target pixel per feet, so as to compute another ratio of the vertical pixel dimension ratio of the specific area F near by the lens to the vertical pixel number corresponding to the target pixel per feet; the image analysis method can compute a pixel zooming ratio of the bottom edge of the surveillance image I to the base line BL of the specific area F corresponding to target pixel per feet in accordance with the vertical ratio, for generating the required perspective transformation matrix. Besides, the image analysis method can further optionally drawn one or several specific areas F between the bottom edge of the surveillance image I and the base line BL of the specific area F corresponding to the target pixel per feet, and then compute the vertical pixel number corresponding to the length of the specific area F in the three-dimensional coordinate system; the image analysis method can determine a pixel number of a distance length from the base line BL to the bottom edge of the surveillance image I after compression in accordance with the vertical pixel number corresponding to the target pixel per feet and the number of the specific area F, so as to compute a possible height value of the adjusted surveillance image I_ad for generating the required perspective transformation matrix.

With regards to the perspective transformation matrix, the image analysis method can acquire a target line TL of the specific area F corresponding to the target pixel per feet, and compute an enlarging ratio of the target line TL to the bottom edge of the surveillance image I; the target line TL can be virtually stretched to be equal to the bottom edge of the surveillance image I, and the adjusted pixel per feet of the specific area F near by the lens can be the same as or similar to the target pixel per feet. Besides, the image analysis method can enlarge the target line TL to be equal to an original length of the bottom edge of the surveillance image I, and further reduce the bottom edge of the surveillance image I to be equal to the original length of the target line TL, which means the lengths of the target line TL and the bottom edge of the surveillance image I can be exchanged; a distance between the enlarged target line TL and the reduced bottom edge can be changed to be equal to a specific height value. The specific height value can be defined as a reduced distance computed by the length in the three-dimensional coordinate system and the object vertical length mentioned as above, or a distance evaluated by the target pixel per feet and the pixel dimension ratio of the specific area F. Therefore, the image analysis method can acquire paired points of perspective transformation to generate the required perspective transformation matrix. The transformed image can be shown in FIG. 9, and the pixel dimension ratio of the bottom edge (which is near by the image receiver 12) of the surveillance image I can be close to the pixel dimension ratio of a target area corresponding to the target pixel per feet. The target area can be interpreted as the object marking frame which conforms to the target pixel per feet.

Figure 10:
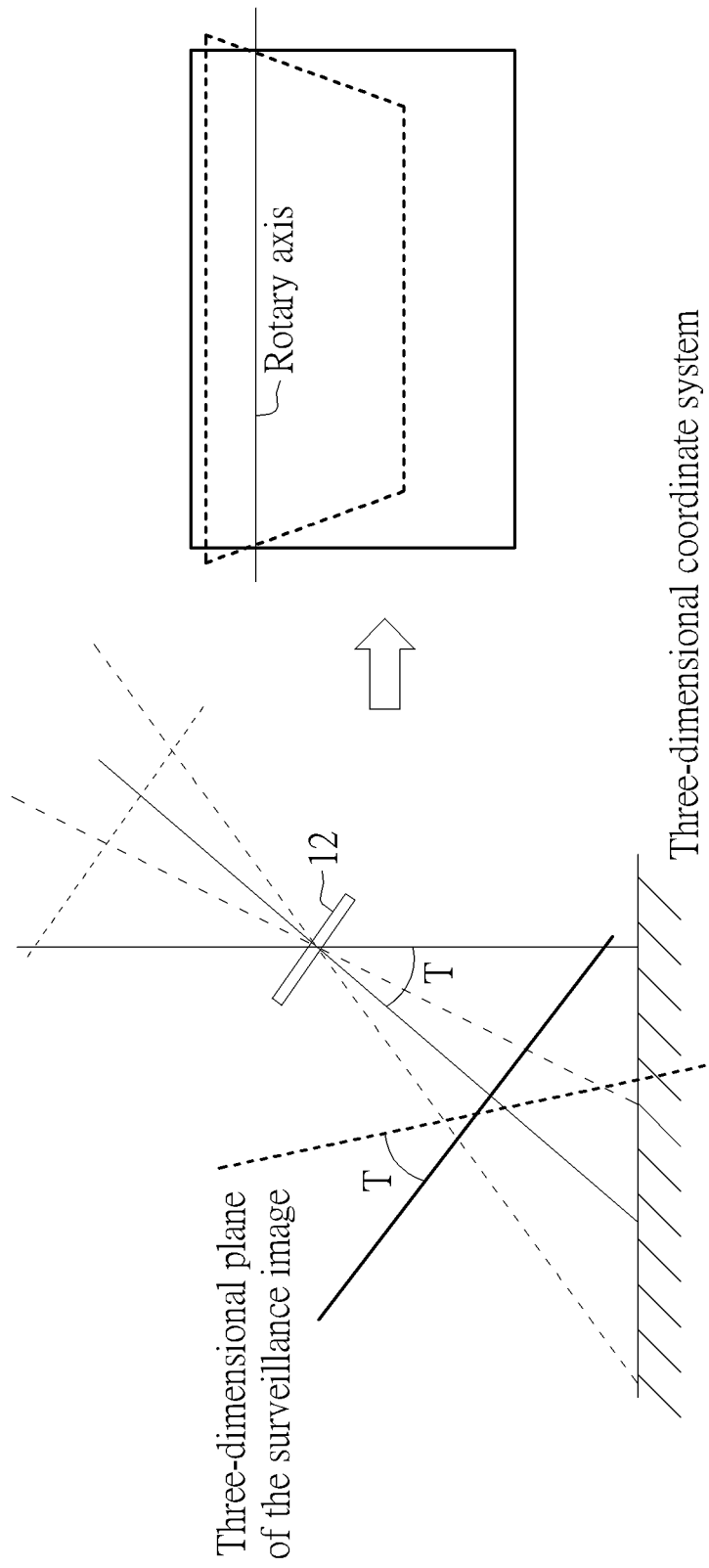
FIG. 10 is a diagram of image transformation according to another embodiment of the present invention.

Please refer to FIG. 10. FIG. 10 is a diagram of image transformation according to another embodiment of the present invention. The image analysis method of the present invention can further optionally utilize a capturing angle T of the image receiver 12 to correspondingly rotate a three-dimensional plane of the surveillance image I and then project it onto a two-dimensional plane; its rotary axis can be a central line between the base line BL and the target line TL, so the target pixel per feet cannot be changed and only the pixel dimension ratios of the specific area F near by the lens and the specific area F far from the lens can be adjusted to be the same as or similar to the target pixel per feet, as a solid border transformed into a dashed border shown in FIG. 10. The present invention provides several image transformation manners mentioned as above to decrease the architectural layers of the deep learning, thereby improving a detection rate and reducing an amount of computation, and more further reducing the amount of the computation by optionally excluding the specific area F with larger sizes through estimation of the marking frame.

The image analysis method of the present invention can further provide another embodiment that can only analyze the specific area F closet to the bottom edge of the surveillance image I, and decide how to adjust the surveillance image I in accordance with the object average height inside the specific area F and the target pixel per feet. For example, in a situation that the target pixel per feet of the object detection network is set as 20 PPF, and the detection combined image Ia contains 512×288 pixels; when the surveillance image I contains 1920×1080 pixels, the vertical pixel number of the specific area F located on the bottom edge of the surveillance image I can be set as 500, and an average height of the specific object inside the specific area F can be set as 5.8 feet, so that the maximal vertical pixel number of the specific area F can be computed as 116 (=5.8×20), and the surveillance image I can be transformed to contain 445×250 [=(1920×1080)*116/500] pixels. The transformed surveillance image I can be combined with the base image having 512×288 pixels to set as the detection combined image Ia, which can be used for the detection data of the object detection network.

In conclusion, the image analysis method and the image analysis device of the present invention can provide several transformation ways to adjust the specific area or the close shot area at different positions inside the surveillance image to have the same or similar pixel dimension ratio. The specific area or the close shot area or the long shot area at different positions inside the surveillance image can have higher direction similarity, so as to increase the computation speed of the object detection network.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image analysis method of increasing identification efficiency and applied to an image analysis device having an image receiver and an operation processor, the image analysis method comprising:
the operation processor setting a target pixel per feet and detecting at least one specific area inside a surveillance image acquired by the image receiver;
the operation processor computing a first dimension ratio difference between the target pixel per feet and an initial pixel per feet of the specific area;
the operation processor utilizing the first dimension ratio difference to adjust the specific area, so that a second dimension ratio difference between the target pixel per feet and an adjusted pixel per feet of the adjusted specific area conforms to a preset condition; and
the operation processor using the adjusted specific area with the adjusted pixel per feet as detection data for an object detection network.

2. The image analysis method of claim 1, further comprising:
the operation processor setting a related marking frame to compute the initial pixel per feet when the specific area is detected.

3. The image analysis method of claim 2, further comprising:
the operation processor combining the adjusted specific area to generate a detection combined image which has the same size as an image input by neural network, and further setting the detection combined image as the detection data for the object detection network.

4. The image analysis method of claim 2, further comprising:
the operation processor setting a selection area based on a bottom line of the specific area when the specific area is greater than a predefined dimension;
the operation processor utilizing the first dimension ratio difference to adjust the selection area;
the operation processor adjusting an exception area within the specific area that does not belong to the selection area in accordance with an adjustment ratio of the selection area; and
the operation processor combining the adjusted selection area and the adjusted exception area to set as the adjusted specific area.

5. The image analysis method of claim 2, further comprising:

the operation processor generating a perspective transformation matrix in accordance with the first dimension ratio difference; and
the operation processor utilizing the perspective transformation matrix to transform the surveillance image into an adjusted surveillance image, so that the specific area inside the adjusted surveillance image is set as the detection data for the object detection network after dimensional adjustment.

6. The image analysis method of claim 5, further comprising:
the operation processor acquiring a base line of the specific area having a pixel dimension ratio corresponding to the target pixel per feet in accordance with an apparatus installation parameter of the surveillance image;
the operation processor computing a bottom edge length of the surveillance image and acquiring a base length of the base line corresponding to the bottom edge length; and
the operation processor at least utilizing a length ratio of the bottom edge length to the base length to generate the perspective transformation matrix.

7. The image analysis method of claim 5, further comprising:
the operation processor acquiring a vertical ratio of a vertical pixel number of the specific area to another vertical pixel number corresponding to the target pixel per feet; and
the operation processor computing a pixel zooming ratio of a bottom edge of a foreground area inside the surveillance image to a base line corresponding to the target pixel per feet for generating the perspective transformation matrix in accordance with the vertical ratio.

8. The image analysis method of claim 7, further comprising:
the operation processor setting at least one specific area between the bottom edge and the base line; and
the operation processor computing a height value of the adjusted surveillance image via the vertical pixel number of the specific area and a number of the at least one specific area for generating the perspective transformation matrix.

9. The image analysis method of claim 5, further comprising:
the operation processor acquiring a target line relevant to the target pixel per feet;
the operation processor computing an enlarging ratio of the target line to a bottom edge of the surveillance image; and
the operation processor generating the perspective transformation matrix in accordance with the enlarging ratio.

10. The image analysis method of claim 5, further comprising:
the operation processor enlarging a target line relevant to the target pixel per feet to be equal to an original length of a bottom edge of the surveillance image;
the operation processor reducing the bottom edge to be equal to an original length of the target line; and
the operation processor generating the perspective transformation matrix in accordance with a zooming ratio and a specific height value between the target line and the bottom edge.

11. An image analysis device comprising:
an image receiver adapted to receive a surveillance image; and
an operation processor electrically connected to the image receiver in a wire manner or in a wireless manner, and adapted to set a target pixel per feet and detecting at least one specific area inside the surveillance image, compute a first dimension ratio difference between the target pixel per feet and an initial pixel per feet of the specific area, utilize the first dimension ratio difference to adjust the specific area so that a second dimension ratio difference between the target pixel per feet and an adjusted pixel per feet of the adjusted specific area conforms to a preset condition, and utilize the adjusted specific area with the adjusted pixel per feet to be detection data for object detection network.

12. The image analysis device of claim 11, wherein the operation processor is adapted to further set a related marking frame to compute the initial pixel per feet when detecting the specific area.

13. The image analysis device of claim 12, wherein the operation processor is adapted to further combine the adjusted specific area to generate a detection combined image have the same size as an image input by neural network, and further setting the detection combined image as the detection data for the object detection network.

14. The image analysis device of claim 12, wherein the operation processor is adapted to further set a selection area based on a bottom line of the specific area when the specific area is greater than a predefined dimension, utilize the first dimension ratio difference to adjust the selection area, adjust an exception area within the specific area that does not belong to the selection area in accordance with an adjustment ratio of the selection area, and combine the adjusted selection area and the adjusted exception area to set as the adjusted specific area.

15. The image analysis device of claim 12, wherein the operation processor is adapted to further generate a perspective transformation matrix in accordance with the first dimension ratio difference, and utilize the perspective transformation matrix to transform the surveillance image into an adjusted surveillance image, so that the specific area inside the adjusted surveillance image is set as the detection data for the object detection network after dimensional adjustment.

16. The image analysis device of claim 15, wherein the operation processor is adapted to further acquire a base line of the specific area having a pixel dimension ratio corresponding to the target pixel per feet in accordance with an apparatus installation parameter of the surveillance image, compute a bottom edge length of the surveillance image and acquiring a base length of the base line corresponding to the bottom edge length, and at least utilize a length ratio of the bottom edge length to the base length to generate the perspective transformation matrix.

17. The image analysis device of claim 15, wherein the operation processor is adapted to further acquire a vertical ratio of a vertical pixel number of the specific area to another vertical pixel number corresponding to the target pixel per feet, and compute a pixel zooming ratio of a bottom edge of a foreground area inside the surveillance image to a base line corresponding to the target pixel per feet for generating the perspective transformation matrix in accordance with the vertical ratio.

18. The image analysis method of claim 17, wherein the operation processor is adapted to further set at least one specific area between the bottom edge and the base line, and compute a height value of the adjusted surveillance image via the vertical pixel number of the specific area and a number of the at least one specific area for generating the perspective transformation matrix.

19. The image analysis method of claim 15, wherein the operation processor is adapted to further acquire a target line relevant to the target pixel per feet, compute an enlarging ratio of the target line to a bottom edge of the surveillance image, and generate the perspective transformation matrix in accordance with the enlarging ratio.

20. The image analysis method of claim 15, wherein the operation processor is adapted to further enlarge a target line relevant to the target pixel per feet to be equal to an original length of a bottom edge of the surveillance image, reduce the bottom edge to be equal to an original length of the target line, and generate the perspective transformation matrix in accordance with a zooming ratio and a specific height value between the target line and the bottom edge.

* * * * *